United States Patent
Jacob

(10) Patent No.: US 8,897,274 B2
(45) Date of Patent: Nov. 25, 2014

(54) SUCCESSIVE INTERFERENCE CANCELLATION STACKED BRANCH VAMOS RECEIVERS

(71) Applicant: ST-Ericsson SA, Plan-les-Ouates (CH)

(72) Inventor: Naveen Jacob, Kottayam (IN)

(73) Assignee: ST-Ericsson SA, Plan-les-Ouates (CH)

( * ) Notice: Subject to any disclaimer, the term of this patent is extended or adjusted under 35 U.S.C. 154(b) by 80 days.

(21) Appl. No.: 13/785,107

(22) Filed: Mar. 5, 2013

(65) Prior Publication Data

US 2014/0044107 A1    Feb. 13, 2014

Related U.S. Application Data

(60) Provisional application No. 61/680,999, filed on Aug. 8, 2012.

(51) Int. Cl.
| | |
|---|---|
| *H04W 4/00* | (2009.01) |
| *H04J 3/00* | (2006.01) |
| *H04B 1/10* | (2006.01) |
| *H04L 5/12* | (2006.01) |
| *H04L 25/02* | (2006.01) |
| *H04L 25/03* | (2006.01) |

(52) U.S. Cl.
CPC .......... *H04B 1/1027* (2013.01); *H04L 25/0206* (2013.01); *H04L 2025/03407* (2013.01); *H04L 25/03006* (2013.01); *H04L 5/12* (2013.01)
USPC ............................ 370/336; 370/313; 370/329

(58) Field of Classification Search
USPC ........................................................ 370/336
See application file for complete search history.

(56) References Cited

U.S. PATENT DOCUMENTS

| | | | |
|---|---|---|---|
| 5,218,619 A | | 6/1993 | Dent |
| 6,128,276 A | * | 10/2000 | Agee .............................. 370/208 |

(Continued)

FOREIGN PATENT DOCUMENTS

| | | |
|---|---|---|
| DE | 19616828 C2 | 2/1999 |
| JP | H10262024 A | 9/1998 |

OTHER PUBLICATIONS

3GPP TS 45.005, V10.5.0, Technical Specification Group GSM/EDGE Radio Access Network; Radio transmission and reception (Release 10), May 2012.

(Continued)

*Primary Examiner* — Jenee Williams
(74) *Attorney, Agent, or Firm* — Leffler Intellectual Property Law, PLLC; Kenneth B. Leffler

(57) ABSTRACT

A receiver receives a desired radio sub-channel transmitted with an unwanted radio sub-channel by producing signal branches from a received radio signal by treating orthogonal components of the received signal separately and also by using one or both of oversampling and multiple receive antennas. Channel estimates for both the desired and unwanted radio sub-channels are produced for signal branches. The unwanted radio sub-channel bits are estimated from a non-stacked form of the received radio signal. The channel estimates and the estimate of the unwanted radio sub-channel bits are used to reconstruct unwanted radio sub-channel components separately for signal branches. Desired radio sub-channel signal branches are produced by subtracting a corresponding one of the reconstructed unwanted radio sub-channel components from signal branches. A non-stacked desired signal is produced by combining the desired radio sub-channel signal branches. The non-stacked desired signal is processed to receive the desired radio sub-channel.

18 Claims, 13 Drawing Sheets

(56) References Cited

U.S. PATENT DOCUMENTS

| | | | |
|---|---|---|---|
| 6,512,737 B1* | 1/2003 | Agee | 370/208 |
| 6,963,546 B2 | 11/2005 | Misra et al. | |
| 7,463,694 B2 | 12/2008 | Kwak et al. | |
| 7,792,486 B2* | 9/2010 | Petruzzelli | 455/3.02 |
| 8,000,420 B2 | 8/2011 | Hui et al. | |
| 8,090,039 B2* | 1/2012 | Fujii | 375/267 |
| 2002/0172182 A1* | 11/2002 | Dotsch et al. | 370/342 |
| 2003/0058786 A1* | 3/2003 | Sato et al. | 370/203 |
| 2003/0099216 A1* | 5/2003 | Nilsson et al. | 370/335 |
| 2003/0123384 A1* | 7/2003 | Agee | 370/208 |
| 2005/0175074 A1 | 8/2005 | Pan et al. | |
| 2007/0147251 A1* | 6/2007 | Monsen | 370/235 |
| 2008/0069032 A1* | 3/2008 | Liu | 370/328 |
| 2009/0135790 A1* | 5/2009 | Yavuz et al. | 370/336 |
| 2010/0157910 A1* | 6/2010 | Nentwig et al. | 370/329 |
| 2011/0122852 A1* | 5/2011 | Yu et al. | 370/337 |
| 2011/0128997 A1* | 6/2011 | da Silva et al. | 375/147 |
| 2011/0267960 A1* | 11/2011 | Beale et al. | 370/241 |
| 2012/0093132 A1* | 4/2012 | Rofougaran | 370/335 |
| 2012/0170482 A1* | 7/2012 | Hwang et al. | 370/252 |
| 2012/0307806 A1* | 12/2012 | Agarwal et al. | 370/336 |

OTHER PUBLICATIONS

Nokia Siemens et al. "Voice Capacity Evolution with Orthogonal Sub Channels" 3GPP TSG GERAN #36, Tdoc GP-071792, Nov. 12-16, 2007 Vancouver, Canada.

Meyer, R. et al. "Efficient Receivers for GSM MUROS Downlink Transmission" 2009 IEEE 20th International Symposium on Personal, Indoor and Mobile Radio Communications, Sep. 13-16, 2009, pp. 2399-2403.

Telefon AB LM Ericsson "SAM—Single Antenna MIMO—for VAMOS" 3GPP TSG GERAN #41, GP-090224, St. Julians, Malta, Feb. 16-20, 2009.

* cited by examiner

SUCCESSIVE INTERFERENCE CANCELLATION STACKED BRANCH VAMOS RECEIVERS

CROSS REFERENCE TO RELATED APPLICATIONS

This application claims the benefit of U.S. Provisional Application No. 61/680,999, filed Aug. 8, 2012, which is hereby incorporated herein by reference in its entirety.

BACKGROUND

The invention relates to Voice services over Adaptive Multi-user channels on One Slot (VAMOS) receivers, and more particularly to techniques for improving the performance of a VAMOS receiver.

Voice capacity is doubled in the Global System for Mobile Communications (GSM) system by means of "Voice services over Adaptive Multi-user channels on One Slot" (VAMOS) technology, whereby two orthogonal subcarriers are transmitted in the same time-slot. The sub channels are separated by using non-correlated training sequences. The use of orthogonal subcarriers can considerably increase voice capacity with low impact to handsets as well as to networks. The concept may double the traditional capacity of the GSM system, for example, a double half rate channel providing that 4 users can be allocated to the same radio slot.

In the receiver side (e.g., mobile station), specialized architectures are made use of to achieve better interference cancellation and to separate out the desired orthogonal subcarrier channel's data. Conventional receiver architectures employed in a VAMOS phase2 ("VAMOS-2") receiver are:
 1. Successive interference cancellation (SIC) receiver.
 2. Joint demodulation (JD) receiver.

Comparing the performance of these conventional receivers, one finds that a joint demodulation receiver outperforms the successive interference cancelation receiver by about 3-5 dB. However, the joint demodulation receiver is computationally complex to implement, and this is a serious drawback especially in a mobile station (mobile receiver). Hence, successive interference cancellation is a preferred choice for mobile receivers.

For at least the foregoing reasons, it is desirable to have improved VAMOS receiver technology (e.g., methods, apparatus) having sufficiently low complexity to make it a good choice for use in mobile receivers, while exhibiting improved performance over its conventional counterparts.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for receiving a desired radio sub-channel transmitted by a transmitter during a time slot, wherein an unwanted radio sub-channel is also transmitted by the transmitter during the time slot and wherein the desired and unwanted radio sub-channels are orthogonal to one another at the time of transmission. This receiving technology involves receiving a radio signal during the time slot, wherein the radio signal comprises the desired and unwanted radio sub-channels. A plurality of signal branches are produced from the received radio signal by treating orthogonal components of the received signal as separate branches and also by generating separate signal branches by one or both of oversampling and using multiple receive antennas. Joint channel estimation is used to independently process more than one of the signal branches and to produce therefrom for each of the more than one of the signal branches a channel estimate for the desired radio sub-channel and a channel estimate for the unwanted radio sub-channel. An estimate of the unwanted radio sub-channel bits from is produced a non-stacked form of the received radio signal. The channel estimates and the estimate of the unwanted radio sub-channel bits are used to reconstruct unwanted radio sub-channel components for each of the more than one of the signal branches. Desired radio sub-channel signal branches are produced by subtracting a corresponding one of the reconstructed unwanted radio sub-channel components from each of the more than one of the signal branches. A non-stacked desired signal is produced by combining the desired radio sub-channel signal branches. The non-stacked desired signal is then processed to receive the desired radio sub-channel.

In some but not necessarily all embodiments, said more than one of the signal branches are the plurality of signal branches.

In some but not necessarily all embodiments, the receiving technology involves selecting the more than one of the signal branches from the plurality of signal branches based on one or more selection criteria. In some but not necessarily all of such embodiments, the one or more selection criteria comprise comparing a sub-channel power imbalance ratio with a predetermined threshold.

In some but not necessarily all embodiments, the orthogonality between the desired and unwanted radio sub-channels is achieved by one of the desired and unwanted radio sub-channels being transmitted as an in-phase component of the radio signal and a different one of the desired and unwanted radio sub-channels being transmitted as a quadrature component of the radio signal.

In some but not necessarily all embodiments, using joint channel estimation to independently process the more than one of the signal branches and to produce therefrom for each of the more than one of the signal branches the channel estimate for the desired radio sub-channel and the channel estimate for the unwanted radio sub-channel comprises, for each of the more than one of the signal branches, recursively refining a branch channel estimate to derive the branch channel estimate for the desired radio sub-channel and the branch channel estimate for the unwanted radio sub-channel.

In some but not necessarily all embodiments, using joint channel estimation to independently process the more than one of the signal branches and to produce therefrom for each of the more than one of the signal branches the channel estimate for the desired radio sub-channel and the channel estimate for the unwanted radio sub-channel comprises estimating a value of a sub-channel power imbalance ratio that was used by the transmitter when forming the radio signal from the desired radio sub-channel and the unwanted radio sub-channel; and for each of the signal branches, scaling a channel estimate of one of a desired user's channel estimate and an unwanted user's channel estimate by a scaling factor that is related to the estimated value of the sub-channel power imbalance ratio. In some but not necessarily all of such embodiments, estimating the value of the sub-channel power imbalance ratio that was used by the transmitter when forming the radio signal from the desired radio sub-channel and the unwanted radio sub-channel comprises choosing an initial sub-channel power imbalance ratio value as a ratio of power of independent least-squares channel estimates; and using an iterative process that begins with the initial sub-channel power imbalance ratio value and refines interim values of the sub-channel power imbalance ratio value until a convergence criterion is satisfied.

In some but not necessarily all embodiments, using the channel estimates and the estimate of the unwanted radio sub-channel bits to reconstruct the unwanted radio sub-channel components for each of more than one of the signal branches comprises for each of the signal branches, convolving the channel estimate for the unwanted radio sub-channel with the estimate of the unwanted radio sub-channel bits.

BRIEF DESCRIPTION OF THE DRAWINGS

The objects and advantages of the invention will be understood by reading the following detailed description in conjunction with the drawings in which.

DETAILED DESCRIPTION

Figure 1:
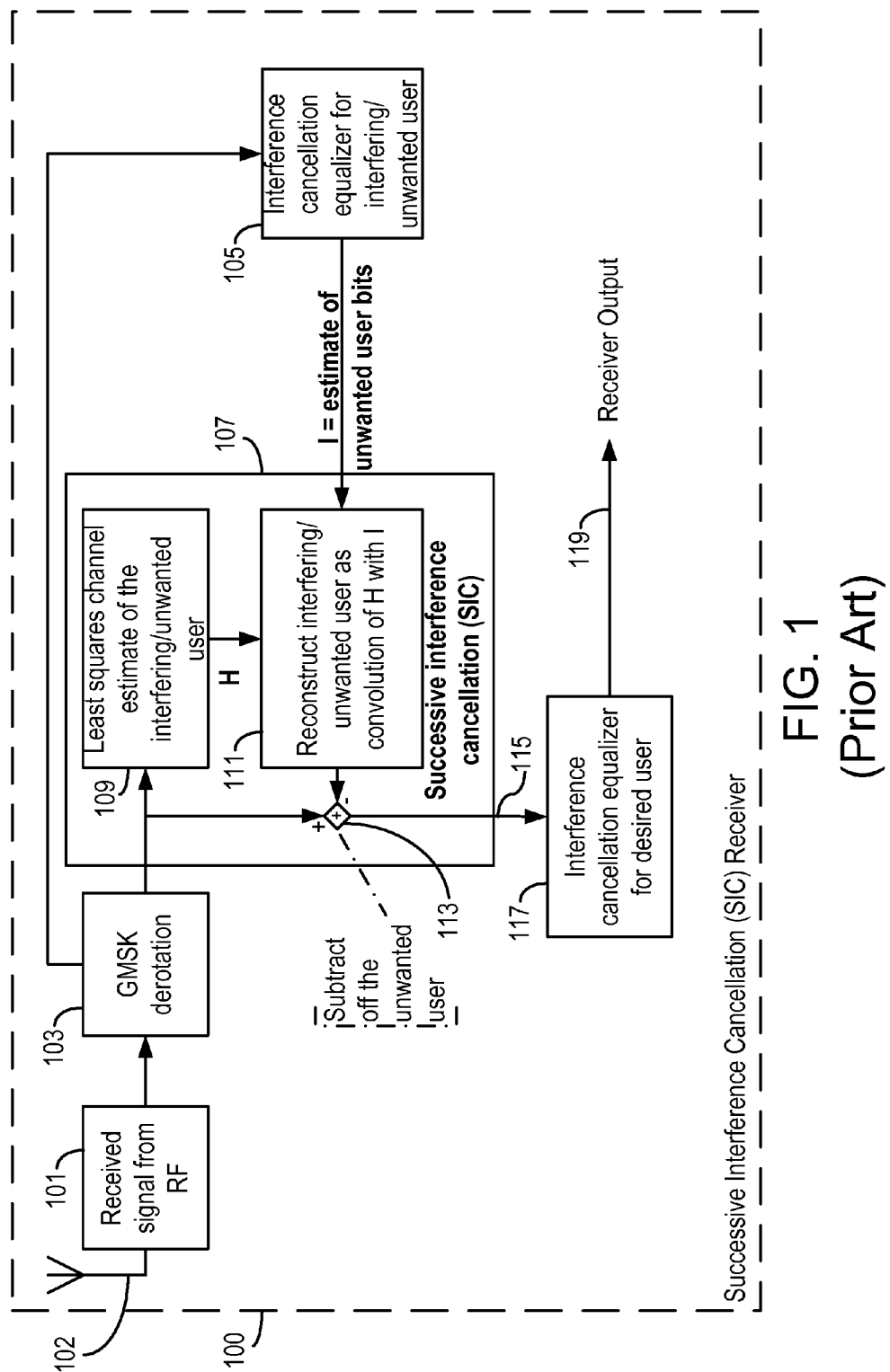
FIG. 1 is a block diagram of a conventional successive interference cancellation receiver.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a successive interference cancellation scheme is applied in VAMOS-2 receivers. In the various embodiments, a desired radio sub-channel signal is obtained from a received signal that contains both the desired radio sub-channel and an orthogonal unwanted radio sub-channel. This involves "stacking" the received radio signal (i.e., converting the received radio signal into multiple independent branches), with each branch then being subjected to successive interference cancellation. (The unwanted radio sub-channel signal is treated as interference for these purposes.)

In another aspect, a joint least squares channel estimate is computed independently for each branch. The initial choice of sub-channel power imbalance ratio (SCPIR) estimate can be derived as the ratio of power of independent channel estimates of the desired radio sub-channel and the unwanted radio sub-channel.

In some embodiments, the channel estimate is refined for each branch recursively. The use of recursion to derive a channel estimate is described in, for example, Raimund Meyer, et al., "Efficient Receivers for GSM MUROS Downlink Transmission", 2009 IEEE 20$^{th}$ Intl. Symposium on Personal, Indoor and Mobile Radio Communications, pages 2399-2403 (13-16 Sep. 2009). At the end of recursions, the refined estimate of the channel vector of each branch is used as a basis for reconstructing each branch's unwanted radio sub-channel component. Each reconstructed unwanted radio sub-channel component can then be subtracted off from the signal on its corresponding branch.

The exemplary embodiments described herein involve four stacked signal branches being produced from the received signal. However, in alternative embodiments, the successive interference cancellation along with the joint estimation that are applied over each signal branch can be extended to higher numbers of stacked branches. For example, the stacking can be achieved by relying on signals supplied by multiple antennas and/or for multiple sampling instants in the case of an oversampled signal. In this way, the use of all available diversity mechanisms can be applied to achieve even better performance.

In some alternative embodiments, a sub-set of branches (i.e., for successive interference cancellation and later demodulation of the desired radio sub-channel) are selected from the bigger set of stacked branches. The subset of branches can be selected using the SCPIR estimate as the selection metric. As a further refinement it is also possible to exercise successive interference cancellation on a first subset of branches, and not on a second subset of branches, with the SCPIR estimate of the individual branch being used as the metric for classifying into subsets.

These and other aspects are described in greater detail in the following.

To facilitate an understanding of the various aspects of embodiments that are in accordance with the invention, it is useful to begin with some foundational information. In the following, exemplary receiver technology is discussed in the context of GSM communication systems because those of ordinary skill in the art will readily understand the terminology and foundational technical information. However, it should be understood that the presentation of such examples is not intended to be limiting. To the contrary, various aspects of the invention can be employed in alternative embodiments that are intended for use in systems that are compliant with communication systems other than GSM.

VAMOS technology involves transmission and reception of signals that have been modulated by means of Adaptive Quadrature Phase Shift Keying (AQPSK) (also called "α-QPSK") techniques, wherein each orthogonal sub-channel is assigned to a different user within the cell. That is, there are two independent users whose signals are orthogonal to one another and are concurrently transmitted, possibly at different power levels to adapt the transmitted signal to channel conditions associated with the users. In any given communication link, one of these users is considered the "desired" user and the other user's signal is considered to be interference. Throughout this disclosure, the user's whose signal is considered to be interference may also be referred to as the "unwanted" user. In VAMOS-2 receivers the training sequence of the interfering/unwanted user's signal is also known to the mobile station receiver, in addition to the training sequence of the desired user's signal. This enables VAMOS-2 receivers to employ better interference cancellation receivers and in this respect the general options are:

Successive interference cancellation (SIC) receiver
Joint demodulation (JD) receiver The block diagram of a conventional successive interference cancellation receiver 100 is shown in FIG. 1. Receiver circuitry 101 receives, via an antenna 102, the radiofrequency (RF) signal that has been encoded in accordance with VAMOS technology so that it includes both a desired user's signal and an unwanted user's signal, the two being orthogonal to one another at the time of transmission. This orthogonality may have been somewhat disrupted as a result of the signal having passed through a channel from the transmitter (not shown) to the SIC receiver 100.

The received signal is supplied to Gaussian Minimum Shift Keying (GMSK) derotation circuitry 103, the purpose of which is to compensate for the rotation that was performed by the transmitter. Considering GSM embodiments as exemplary embodiments, the transmitter chain has a "rotation" block at the end of the chain, and the receiver chain has a "derotation" block in the begin of its receive chain to do the inverse of the rotation that had been performed by the transmitter. The interested reader can refer to 3GPP TS 45.005, V10.5.0 Technical Specification Group GSM/EDGE Radio Access Network; Radio transmission and reception (Release 10), May 2012 for more information.

The GMSK derotation circuitry 103 supplies the de-rotated signal to two destinations: a first interference cancellation equalizer 105 and successive interference cancellation (SIC) circuitry 107. The first interference cancellation equalizer 105 uses the unwanted user's pilot signal (embedded in the received signal) to process the de-rotated signal and to generate therefrom an estimate (I) of the unwanted user's bit stream.

The SIC circuitry 107 includes a least squares channel estimator 109 that uses known least squares channel estimation techniques to produce a channel estimate (H) of the unwanted user's signal from the de-rotated signal supplied by the GMSK derotation circuitry 103. The channel estimate, H, and the estimate of the unwanted user's bit stream, I, are both supplied to signal reconstruction circuitry 111 that convolves these to produce a reconstructed signal that represents the unwanted user's signal.

The SIC circuitry 107 includes a subtractor 113 that subtracts the unwanted user's reconstructed signal from the original de-rotated signal. The resultant signal 115 is essentially a de-rotated signal that represents the desired user's signal. The resultant signal 115 still includes its own interference components stemming from, for example, multi-path propagation through the channel between the transmitter and the receiver 100. Therefore, the resultant signal 115 is supplied to a second interference cancellation equalizer 117. The second interference cancellation equalizer 117 uses the desired user's pilot signal (embedded in the received signal) to process the resultant signal 115 and to generate therefrom an estimate of the desired user's bit stream, which constitutes the receiver output 119.

Figure 2:
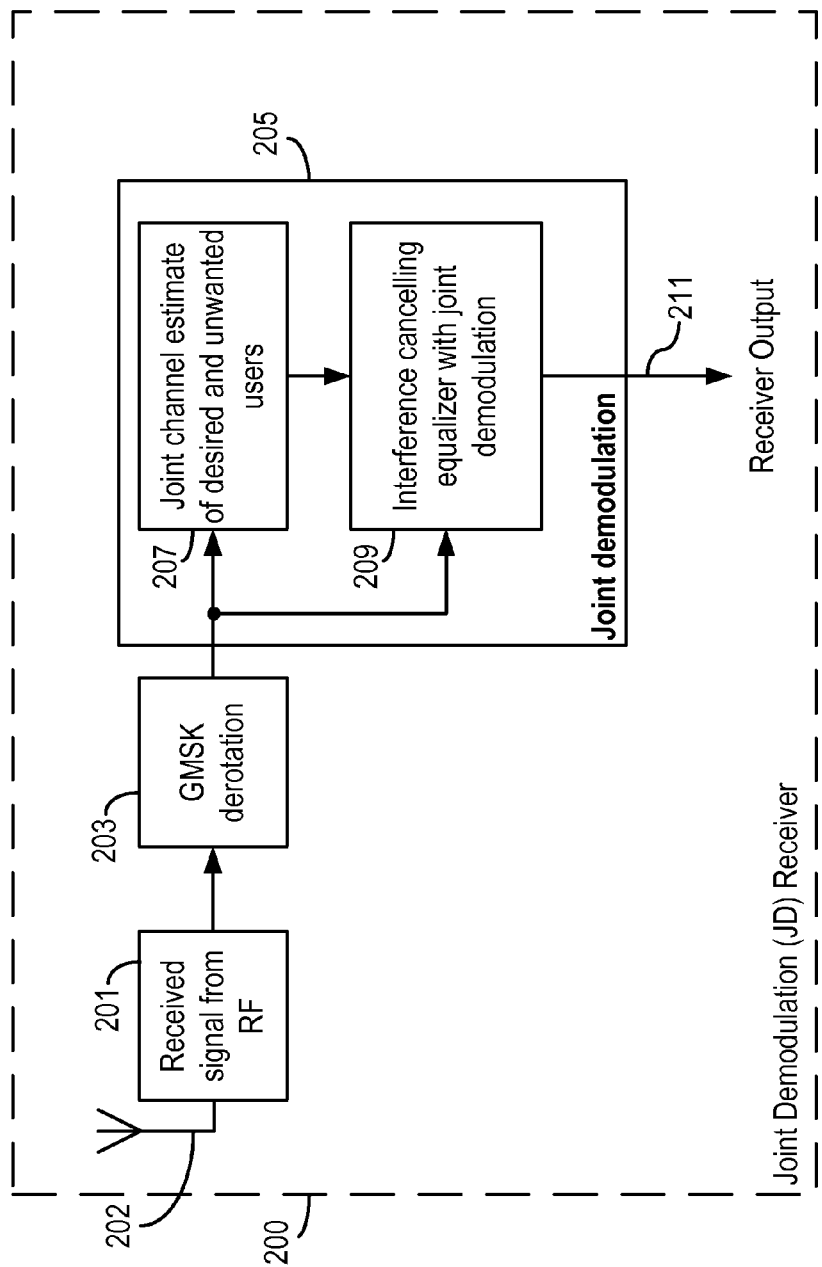
FIG. 2 is a block diagram of a conventional Joint Demodulation receiver.

Looking now at a second known option for receiving a VAMOS signal, FIG. 2 is a block diagram of a conventional Joint Demodulation (JD) receiver 200. Receiver circuitry 201 receives, via an antenna 202, the RF signal that has been encoded in accordance with VAMOS technology so that it includes both a desired user's signal and an unwanted user's signal, the two being orthogonal to one another at the time of transmission. This orthogonality may have been somewhat disrupted as a result of the signal having passed through a channel from the transmitter (not shown) to the JD receiver 200.

The received signal is supplied to GMSK derotation circuitry 203, the purpose of which is to compensate for the rotation that was performed by the transmitter. As explained earlier, this compensation is in the form of a signal rotation that is the inverse of the rotation applied by the transmitter.

The GMSK derotation circuitry 203 supplies the de-rotated signal to joint demodulation circuitry 205. The joint demodulation circuitry 205 includes joint channel estimation circuitry 207 that uses known joint channel estimation techniques as well as the pilot signals of both the desired and unwanted users to arrive at channel estimates.

The joint channel estimation circuitry 207 supplies the produced channel estimates to interference cancelling equalizer with joint demodulation circuitry 209 that uses known techniques to produce, from the de-rotated signal and the joint channel estimates, the receiver output 211 in the form of a bit stream representing the desired user's transmitted information. The unwanted user's bit stream is simply discarded as being interference.

In general, the complexity of a JD receiver is high due to the amount of processing required for joint demodulation. Consequently, successive interference cancellation is an attractive choice of implementation for mobile station receivers, where size and power consumption are important considerations in any design.

Figure 3:
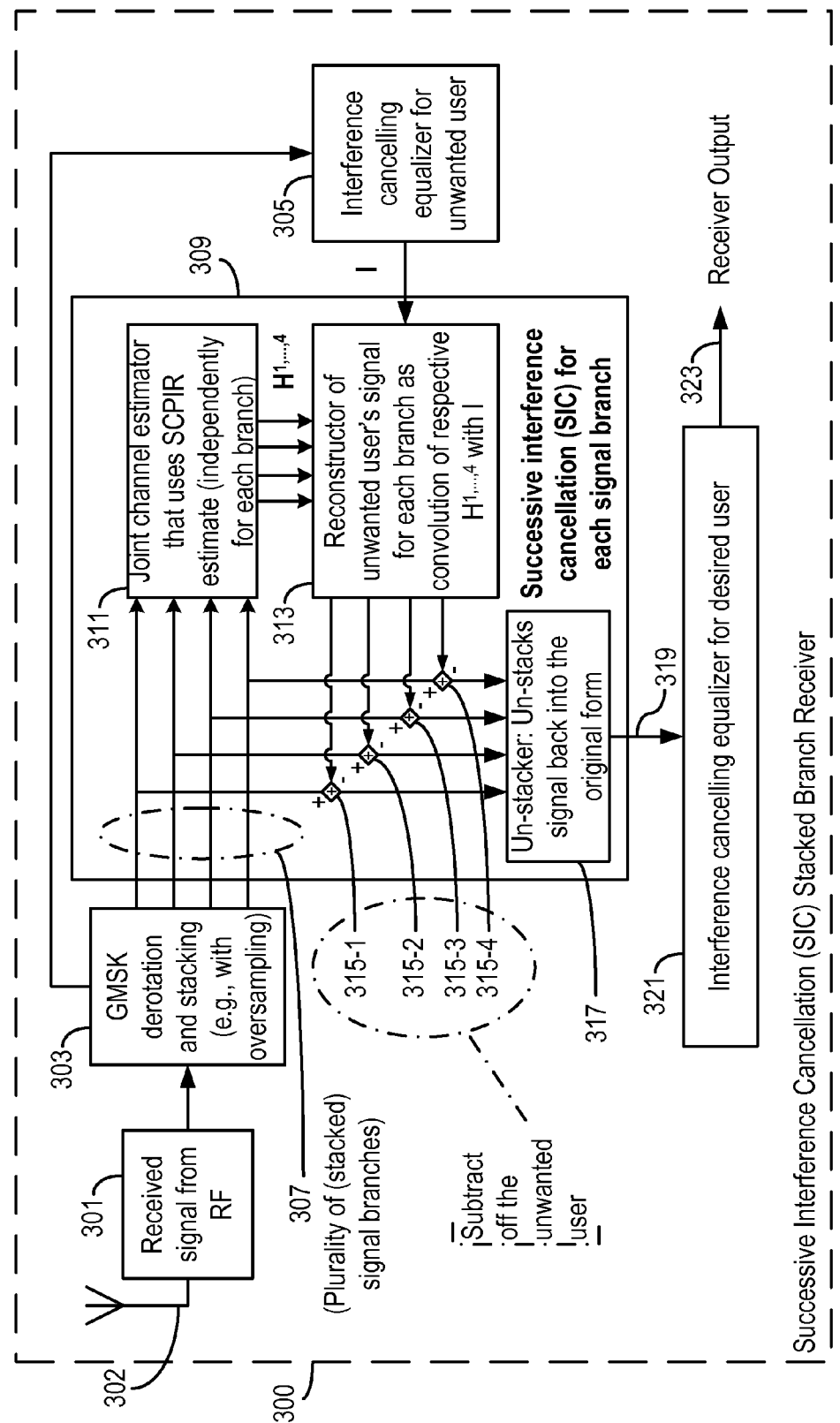
FIG. 3 is a block diagram of an exemplary VAMOS receiver in accordance with embodiments of the invention.

FIG. 3 is a block diagram of an exemplary VAMOS receiver 300 in accordance with embodiments of the invention. Receiver circuitry 301 receives, via antenna 302, the RF signal that has been encoded in accordance with VAMOS technology so that it includes both a desired user's signal and an unwanted user's signal, the two being orthogonal to one another at the time of transmission. As explained earlier, this orthogonality may have been somewhat disrupted as a result of the signal having passed through a channel from the transmitter (not shown) to the VAMOS receiver 300.

The received signal is supplied to GMSK derotation and stacking circuitry 303, one purpose of which is to compensate for the rotation that was performed by the transmitter. This compensation involves rotating the received signal by an amount that is the inverse of the rotation that had been performed by the transmitter.

The GMSK derotation and stacking circuitry 303 supplies the full de-rotated signal to a first interference cancellation equalizer. The first interference cancellation equalizer 305 uses the unwanted user's pilot signal (embedded in the full de-rotated received signal) to process the de-rotated signal and to generate therefrom an estimate (I) of the unwanted user's bit stream.

The GMSK derotation and stacking circuitry 303 also forms a plurality of signal branches (stacked signals) 307 from the de-rotated signal and supplies these to SIC circuitry 309 that applies successive interference cancellation separately to each signal branch. The stacking functionality of the GMSK derotation and stacking circuitry 303 is described in greater detail below, following this overview of FIG. 3.

The SIC circuitry 309 includes a joint channel estimator 311 that receives the plurality of signal branches 307 from the GMSK derotation and stacking circuitry 303 and, using an SCPIR estimate independently for each branch, produces, for each branch, a channel estimate ($H^k$, where $k=1, \ldots, N_{Number\_of\_branches}$, e.g., in FIG. 3 $N_{Number\_of\_branches}=4$) of the unwanted user's signal in each respective one of the branches 307. The channel estimate, $H^k$, and the estimate of the unwanted user's bit stream, I, are both supplied to signal reconstruction circuitry 313 that convolves these, separately for each of the channel estimates $H^k$, to produce a respective reconstructed signal for each branch that represents the unwanted user's signal on that respective one of the signal branches 307. The signal reconstruction functionality of the signal reconstruction circuitry 313 is described in greater detail below, following this overview of FIG. 3.

In this exemplary embodiment, the SIC circuitry 309 also includes a plurality of subtractors 315-1, 315-2, 315-3, 315-4. In this class of embodiments, the number of subtractors will be equal to the number of separate signal branches that are being processed. Each of the subtractors 315-1, 315-2, 315-3, 315-4 subtracts one of the unwanted user's reconstructed signals (supplied at the output of the signal reconstruction circuitry 313) from a corresponding one of the signal branches 307. Each of the resultant signals is essentially a de-rotated signal that represents the desired user's signal on that signal branch. The outputs of the subtractors 315-1, 315-2, 315-3, 315-4 are supplied to un-stacking circuitry 317 that combines these in a signal un-stacking operation that results in a reconstituted signal 319 that represents the desired user's signal.

The reconstituted signal 319 still includes its own interference components stemming from, for example, multi-path propagation through the channel between the transmitter and the receiver 300. Therefore, the resultant signal 319 is supplied to a second interference cancelling equalizer 321. The second interference cancelling equalizer 321 uses the desired user's pilot signal (embedded in the received signal) to process the reconstituted signal 319 and to generate therefrom an estimate of the desired user's bit stream, which constitutes the receiver output 323.

The following discussion presents more details about some of the component parts of the exemplary receiver 300 depicted in FIG. 3.

1. Stacking the Antenna Received Signal (Output of Receiver Circuitry 301) to Produce a Plurality of Signal Branches 307

A conventional SAIC receiver treats the received complex signal as a real-part forming one version of the received signal (e.g., desired user's signal), and a separate imaginary-part forming the other (e.g., unwanted user's signal). This is particularly useful in co-channel interference (CCI) scenarios, and VAMOS inherently falls into this class as the interfering channel is paired with the desired user here. To achieve better CCI suppression, embodiments that are consistent with the invention derive a plurality of signal branches 307 by extracting the in-phase (real) and quadrature (imaginary) components and further by generating additional separate signal branches by one or both of oversampling and using multiple receive antennas. For example, signals derived from separate antennas (without oversampling) can each be split into in-phase and quadrature components, thereby deriving a number of separate branches equal to two times the number of antennas. In the case of oversampling (without multiple antennas), consecutive samples can be allocated into different branches. For example, in the case of oversampling by two, even samples can be allocated to one pair of in-phase and quadrature components, and odd samples can be allocated to a different pair of in-phase and quadrature components, thereby resulting in four separate signal branches. It will be recognized that even more branches can be derived by using a higher rate of oversampling and/or by using both oversampling and plural antennas.

These stacked branches form additional information about the interferer signal (and hence better modeling of the interferer signal) which, as explained above with reference to FIG. 3 are eventually reconstructed as separate signals and subtracted off of each branch's signal by means of successive interference cancellation.

As has been described in, for example, NOKIA SIEMENS NETWORKS et al. "Voice Capacity Evolution with Orthogonal Sub Channels" 3GPP TSG GERAN #36, Tdoc GP-071792, 12-16 Nov. 2007, Vancouver, Canada, which is hereby incorporated herein by reference in its entirety, the α-QPSK modulated, baseband, received signal ($r_n$) sampled at the symbol rate can be written in terms of an L-tap complex-valued channel $(h_k)_{k=0}^{L-1}$, the user 1 binary symbols $(a_n)_{n=0}^{N}$, the binary symbols for user 2, $(b_n)_{n=0}^{N}$ (which one of "user 1" and "user 2" represents the "desired user" and which one represents the "unwanted user" depends on the particular receiver), the rotation angle θ (with θ=π/2 for the typical GMSK modulation used in GSM) and complex-valued noise plus interference ($w_n$) in accordance with the following (where, in accordance with common engineering notation, j represents the square root of −1):

$$r_n = \frac{\alpha}{\sqrt{2}} \sum_{k=0}^{L-1} h_k e^{(n-k)j\theta} a_{n-k} + j \frac{\sqrt{2-\alpha^2}}{\sqrt{2}} \sum_{k=0}^{L-1} h_k e^{(n-k)j\theta} b_{n-k} + w_n \quad (1)$$

After derotation by θ, this becomes:

$$r'_n = \frac{\alpha}{\sqrt{2}} \sum_{k=0}^{L-1} h'_k a_{n-k} + j \frac{\sqrt{2-\alpha^2}}{\sqrt{2}} \sum_{k=0}^{L-1} h'_k b_{n-k} + w'_n \quad (2)$$

where the prime superscript indicates that the signal and the channel taps have been de-rotated.

Taking real and imaginary parts in Equation (2), and using the fact that the symbols $(a_n)_{n=0}^N$ and $(b_n)_{n=0}^N$ are real-valued, the following pair of equations are obtained:

$$\Re e(r'_n) = \quad (3)$$
$$\frac{\alpha}{\sqrt{2}} \sum_{k=0}^{L-1} \Re e(h'_k) a_{n-k} - \frac{\sqrt{2-\alpha^2}}{\sqrt{2}} \sum_{k=0}^{L-1} \Im m(h'_k) b_{n-k} + \Re e(w'_n),$$

$$\Im m(r'_n) = \frac{\alpha}{\sqrt{2}} \sum_{k=0}^{L-1} \Im m(h'_k) a_{n-k} + \frac{\sqrt{2-\alpha^2}}{\sqrt{2}} \sum_{k=0}^{L-1} \Re e(h'_k) b_{n-k} +$$
$$\Im m(w'_n).$$

By defining $$\vec{r}_n = \begin{bmatrix} \Re e(r'_n) \\ \Im m(r'_n) \end{bmatrix},$$

$$H_k = \begin{bmatrix} \frac{\alpha}{\sqrt{2}} \Re e(h'_k) & -\frac{\sqrt{2-\alpha^2}}{\sqrt{2}} \Im m(h'_k) \\ \frac{\alpha}{\sqrt{2}} \Im m(h'_k) & \frac{\sqrt{2-\alpha^2}}{\sqrt{2}} \Re e(h'_k) \end{bmatrix},$$

and $$\vec{w}_n = \begin{bmatrix} \Re e(w'_n) \\ \Im m(w'_n) \end{bmatrix},$$

equation (3) can be rewritten in matrix form as follows:

$$\vec{r}_n = \sum_{k=0}^{L-1} H_k \begin{bmatrix} a_{n-k} \\ b_{n-k} \end{bmatrix} + \vec{w}_n \quad (4)$$

Equation (4) shows that the real-part of the received signal ($\Re e(r'_n)$) has contributions from both sequences—the binary symbols of user 1, $(a_n)_{n=0}^N$, and the binary symbols for user 2, $(b_n)_{n=0}^N$. The contributions of the two users are proportional to the SCPIR value. Similar properties hold for the imaginary part of the received signal.

Therefore, embodiments consistent with the invention represent the received (de-rotated) signal in stacked form (i.e., as a plurality of separate signal branches) with the channel response estimated using both user1 and user2 reference training sequences (i.e., pilot signals). General principles concerning signal stacking are described in, for example, Hui et al. U.S. Pat. No. 8,000,420, which issued on Aug. 16, 2011 and which is hereby incorporated herein by reference in its entirety. However, the inventors of the subject matter described herein have adapted these principles for use in successive interference cancellation within the context of a VAMOS receiver.

2. Joint Channel Estimator 311 and its Use of Recursion

The joint channel estimator 311 needs to take into account that both users' signals in principle propagate through the same channel and that the channel impulse response of user 2 is that of user 1 scaled by a factor c (and j).

Given the following representation $$H_k = \begin{bmatrix} H_{k0} & H_{k1} \\ H_{k2} & H_{k3} \end{bmatrix},$$

the elements $H_{k0}$ and $H_{k1}$ will be related by a scaling factor that is itself related to the value of SCPIR; that is, $c = \sqrt{2-\alpha^2}/\alpha$.

On denoting $H = \alpha H_{k0}$, one obtains $$H_k = \begin{bmatrix} H & -cH \\ H & cH \end{bmatrix}.$$

Consequently, in vector form the imaginary-part of received vector $\vec{r}$ can be expressed as follows:

$$Im\vec{r} = AH + cBH + w \quad (5)$$

where A and B represent (N−L)×(L+1) Toeplitz convolution matrices corresponding to the training sequences of user 1, $(a_n)_{n=0}^N$ and user 2, $(b_n)_{n=0}^N$ respectively (N is the length of training sequences), $H = (h[0]h[1] \ldots h[L-1])^T$, w is the vector containing the noise and interference contributions, and L is the length of the channel vector. In this regard, the interested reader can refer to the Meyer et al. document referenced earlier. Meyer et al. further show that the two conditions for the maximum likelihood (ML) estimates of H and c are:

$$\hat{H} = (V^H V)^{-1} V^H \vec{r}$$

$$\hat{c} = (\hat{H}^H B^H B \hat{H})^{-1} Re[(\hat{H}^H B^H)(\vec{r} - A\hat{H})] \quad (6)$$

where V=(A+jĉB). The above equations may be also viewed as ML channel estimate of SCPIR ratio (c) for a given channel vector or vice-versa. However, a closed-form solution for Ĥ and ĉ from does not exist because they are coupled equations. Hence, a solution is calculated iteratively by inserting an initial choice for ĉ in Equation (6), and then using the resulting channel vector for refining Ĥ until convergence is reached.

Similar representations can be made for the real part of received vector $\vec{r}$, and hence Equations (5) and (6) hold for the real-part of the received signal as well.

In exemplary embodiments, the joint channel estimator 311 performs the recursive calculation independently for each of the plural signal branches 307, with B being a Toeplitz convolution matrix made from ĉ times the training sequence. Convergence is reached when the estimated SCPIR values ĉ between iterations differ by a predetermined amount, the value of this predetermined amount preferably being arrived at by simulations. An initial SCPIR estimate ĉ for starting the recursion is chosen as the ratio of the power of independent least-squares channel estimates.

As in Equation (4), the estimated channel matrix $H_k$ has its individual elements to be real valued. However, when frequency drift is introduced as a result of frequency error and a fading channel, the real part of the transmitted signal will leak into the imaginary part and vice-versa. Hence, each element of the estimated channel matrix $H_k$ will be complex containing both user1 and user2. Therefore, each element of $H_k$ is estimated by means of joint channel estimation (with the SCPIR ratio being used to derive the scaled reference training sequence pattern V of Equation (6)).

3. Functionality of the Signal Reconstruction Circuitry 313

As mentioned earlier, the signal reconstruction circuitry 313 separately convolves each of the channel estimates, $H^k$, with the estimate of the unwanted user's bit stream, I, to produce a respective reconstructed signal for each branch that represents the unwanted user's signal on that respective one of the signal branches 307. This section provides more detail about this function.

Given an embodiment in which the unwanted user's signal is to be cancelled out of four signal branches (e.g., such as is shown in FIG. 3), the inputs to the reconstruction circuitry 313 are the channel estimate matrix $H=[H^1\ H^2\ H^3\ H^4]$ and the estimated interferer bits vector I. Let the output of the reconstruction circuitry 313 be represented by the output matrix $R=[R_1\ R_2\ R_3\ R_4]$. The elements of H matrix and R matrix are column vectors corresponding to the respective branches of FIG. 3.

The function of the reconstruction circuitry 313 can be described as $$R = \text{convolution}(H, I)$$

and $$R = [R_1 R_2 R_3 R_4]$$

where the column vectors $R_1$, $R_2$, $R_3$, $R_4$ are derived as follows:

$$R_1(n) = \sum_k H^1_{Im}(k) I(n-k)$$

$$R_2(n) = \sum_k H^2_{Im}(k) I(n-k)$$

$$R_3(n) = \sum_k H^3_{Im}(k) I(n-k)$$

$$R_4(n) = \sum_k H^4_{Im}(k) I(n-k)$$

where the column vector of H matrix, $$H_k = H_{Re}^k + j H_{Im}^k$$

corresponds to the channel estimate for the $k^{th}$ stacked line. Also the real part $H_k$, which is denoted $H_{Re}^k$, corresponds to the channel estimate of the user1 signal (e.g., desired user's signal), and $H_{Im}^k$ corresponds to the channel estimate of the user2 signal (e.g., unwanted user's signal.

4. Functionality of SIC Circuitry 309

As explained above, successive interference cancellation is done by reconstructing the unwanted user's signal as the convolution of estimated unwanted user's bits with the estimated channel coefficients. The joint least squares estimate with the SCPIR estimate as the scaling factor between the two training sequence(s) (i.e., pilot signals for user 1 and user 2, respectively) refines the desired signal power and interferer power across each stacked branch. Consequently, convolving the estimated interferer bits with the branch channel estimates reconstructs the unwanted user's signal contribution in the received signal for that branch. The reconstructed signal is subtracted from the received signal, per branch, and the reconstituted signal 319 (un-stacked signal) is supplied for demodulating the desired user's information.

In the exemplary embodiment depicted in FIG. 3, a single antenna receiver is illustrated and a 2× baseband signal stream (i.e., 2-times oversampling is applied). The signal is stacked as four branches (signal branches 307) for performing the successive interference cancellation. The signal branches 307 can be characterized as follows:

1. Branch 1: Real part of the first set of (I, Q) samples (e.g., even numbered samples) of the received 2× signal stream.
2. Branch 2: Imaginary part of the first set of (I, Q) samples (e.g., even numbered samples) of the received 2× signal stream.
3. Branch 3: Real part of the second set of (I, Q) samples (e.g., odd numbered samples) of the received 2× signal stream.
4. Branch 4: Imaginary part of the second set of (I, Q) samples (e.g., odd numbered samples) of the received 2× signal stream.

Figure 4:
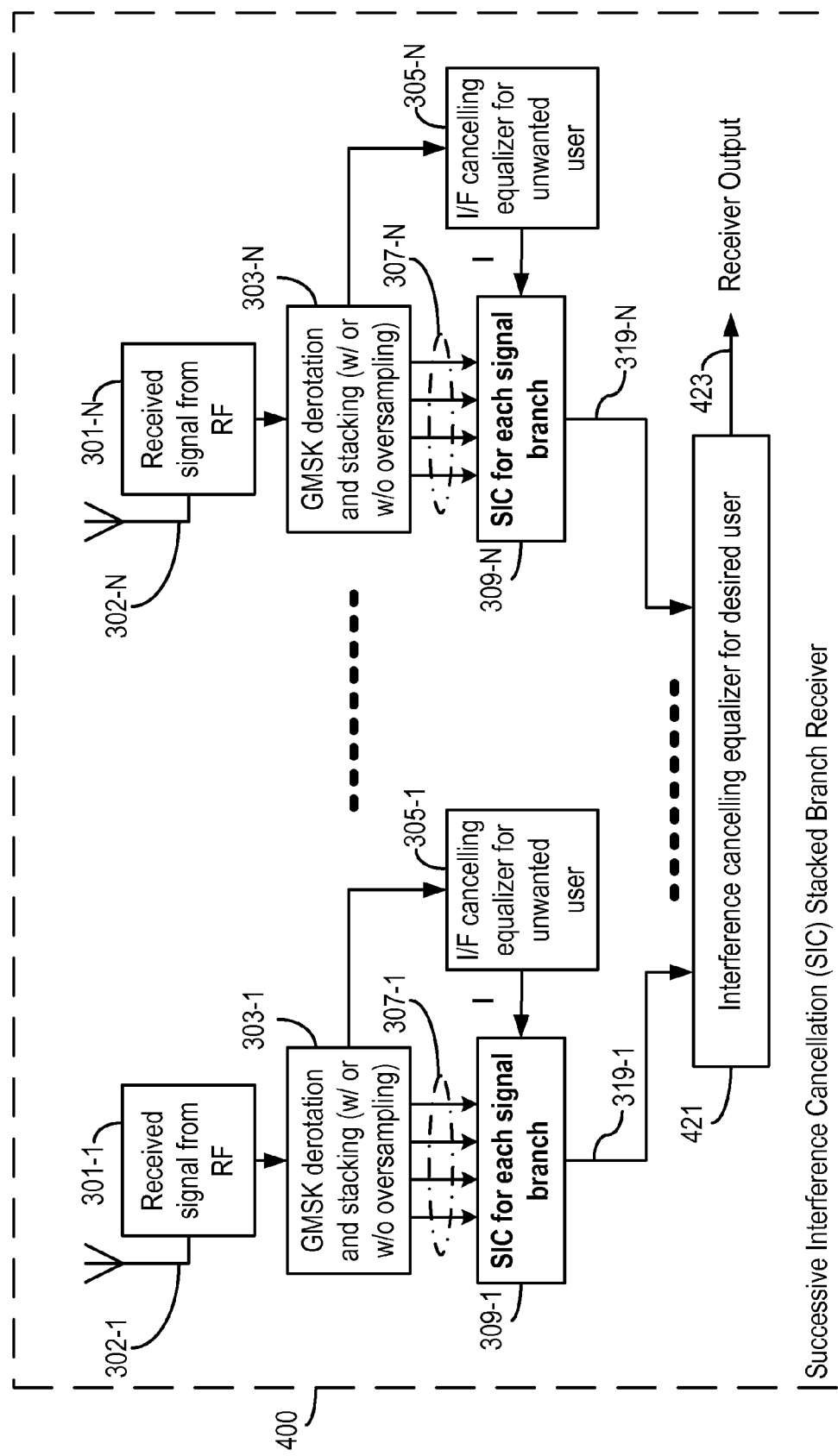
FIG. 4 is a block diagram of an exemplary embodiment that is consistent with alternative embodiments in which plural antennas are used.

The technology involving stacking the received signal as multiple branches to perform joint channel estimation and finally successive interference cancellation is extendable for multiple antenna signal streams as well, and this can be applied with or without oversampling. In all cases, however, the orthogonality of the received signals (i.e., in-phase/Real and quadrature/Imaginary components) is used as one basis for separating signals into separate branches. FIG. 4 is a block diagram of an exemplary embodiment that is consistent with alternative embodiments in which plural antennas 302-1, . . . , 302-N are used (with N representing the number of antennas). In this exemplary embodiment, each of the antennas 302-1, . . . , 302-N is coupled to its own circuit components, such that antenna 302-1 is coupled to receiver circuitry 301-1, GMSK derotation and stacking circuitry 303-1, a first interference cancellation equalizer 305-1, and SIC circuitry 309-1, and so on with antenna 302-N being coupled to receiver circuitry 301-N, GMSK derotation and stacking circuitry 303-N, a first interference cancellation equalizer 305-N, and SIC circuitry 309-N. These circuit components function as was described with respect to their similarly numbered components in FIG. 3 (i.e., 301, 302, 303, 305, 309) except that in some but not necessarily all embodiments, the GMSK derotation and stacking circuitry 309-x does not need to itself generate additional stacked signals beyond separating the in-phase and quadrature phases of the signal into separate branches (e.g., stacking by means of oversampling is not an essential feature). This is possible because, even if each antenna results in only a single corresponding reconstituted signal 319-x being produced, the same technological affect is achieved by means of the plural antennas that result in plural reconstituted signals 319-1, . . . , 319-N being generated and supplied to a commonly used second interference cancelling equalizer 421 that produces a receiver output signal 423.

In the class of embodiments illustrated by FIG. 4, circuitry associated with each respective one of the antennas 302-1, . . . , 302-N included a respective first interference cancellation equalizer 305-1, . . . , 305-N and also a respective SIC circuitry 309-1, . . . , 309-N. Illustrating the embodiments in this manner is believed to facilitate the reader's understanding of the various aspects of embodiments consistent with the invention. However, it will be understood that in alternative embodiments, all of the first interference cancellation equalizers 305-1, . . . , 305-N can be combined into a single first interference cancellation equalizer 305. Alternatively, or in addition, all of the SIC circuitry 309-1, . . . , 309-N can be combined into a single SIC circuitry 309. By matrix operations, each path will have a unique identity and the interference will be modeled therein.

Figure 5:
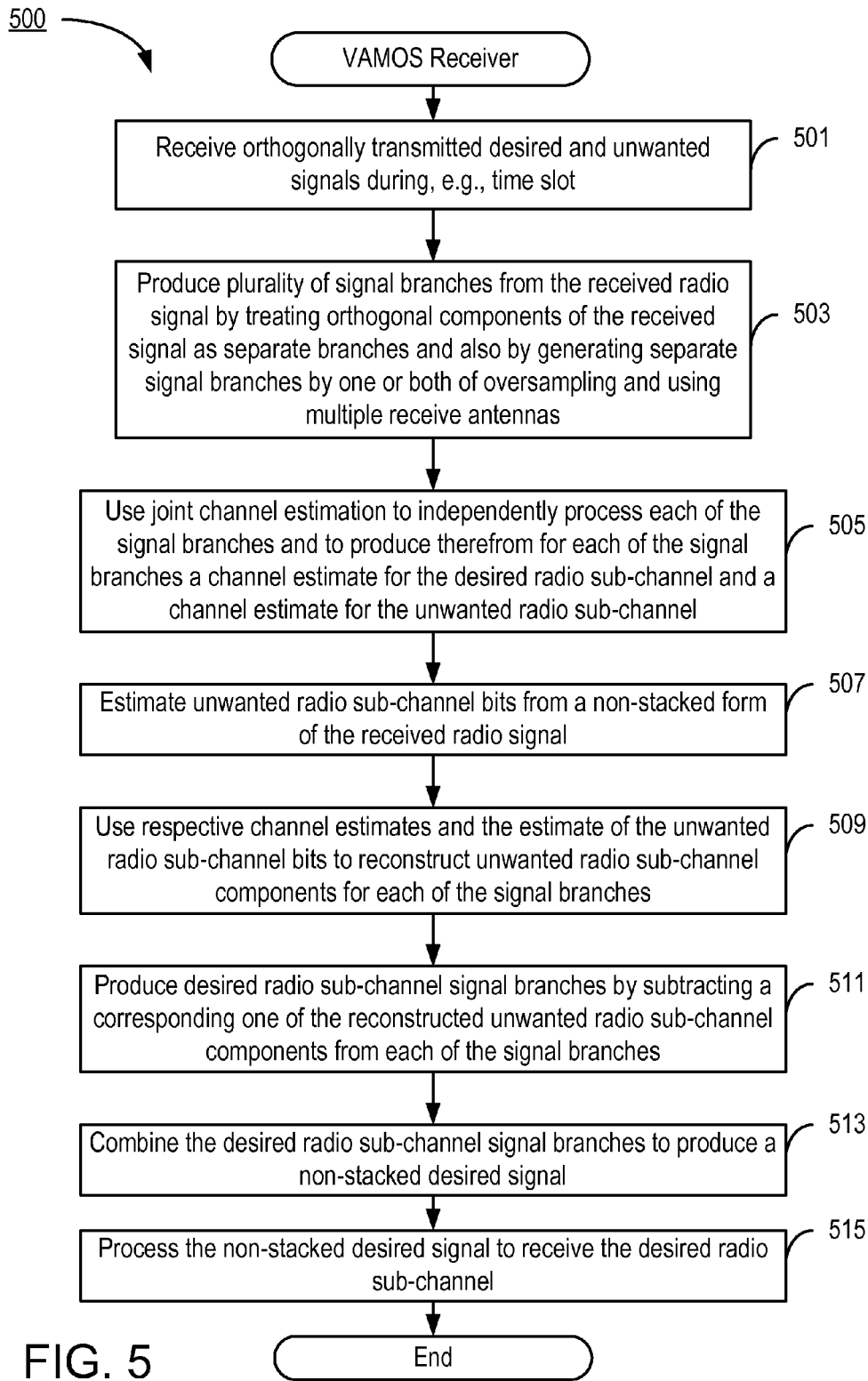
FIG. 5 is, in one respect, a flow chart of steps/processes performed by a receiver in accordance with some but not necessarily all exemplary embodiments of the invention.

To further illustrate aspects of embodiments consistent with exemplary embodiments of the invention, FIG. 5 is, in one respect, a flow chart of steps/processes performed by a receiver (e.g., the receiver 300, the receiver 400) in accordance with some but not necessarily all exemplary embodiments of the invention. In another respect, FIG. 5 can be considered to depict exemplary means 500 comprising the various illustrated circuitry (e.g., hard-wired and/or suitably programmed processor) configured to perform the described functions.

The illustrated embodiment enables reception of a desired radio sub-channel transmitted by a transmitter during a time slot, wherein an unwanted radio sub-channel is also transmitted by the transmitter during the time slot and wherein the desired and unwanted radio sub-channels are orthogonal to one another at the time of transmission. The illustrated embodiment begins with receiving a radio signal during the time slot, wherein the radio signal comprises the desired and unwanted radio sub-channels (step 501).

The circuitry then produces a plurality of signal branches from the received radio signal by treating orthogonal components of the received signal as separate branches and also by generating separate signal branches by one or both of oversampling and using multiple receive antennas (step 503).

Joint channel estimation circuitry is employed to independently process each of the signal branches and to produce therefrom for each of the signal branches a channel estimate for the desired radio sub-channel and a channel estimate for the unwanted radio sub-channel (step 505).

Circuitry also produces an estimate of the unwanted radio sub-channel bits from a non-stacked form of the received radio signal (step 507).

The channel estimates and the estimate of the unwanted radio sub-channel bits are used (e.g., by means of convolution) to reconstruct unwanted radio sub-channel components for each of the signal branches (step 509).

Desired radio sub-channel signal branches are produced by subtracting a corresponding one of the reconstructed unwanted radio sub-channel components from each of the signal branches (step 511).

A non-stacked desired signal is produced by combining the desired radio sub-channel signal branches (step 513).

The non-stacked desired signal is then processed (e.g., by means of an interference cancelling equalizer) to receive the desired radio sub-channel (step 515). The resultant received signal can be in the form of, for example, soft values (i.e., decisions whether a given bit is a "1" or a "0" in conjunction with a probability value indicating the likelihood that the decision is correct).

Figure 6:
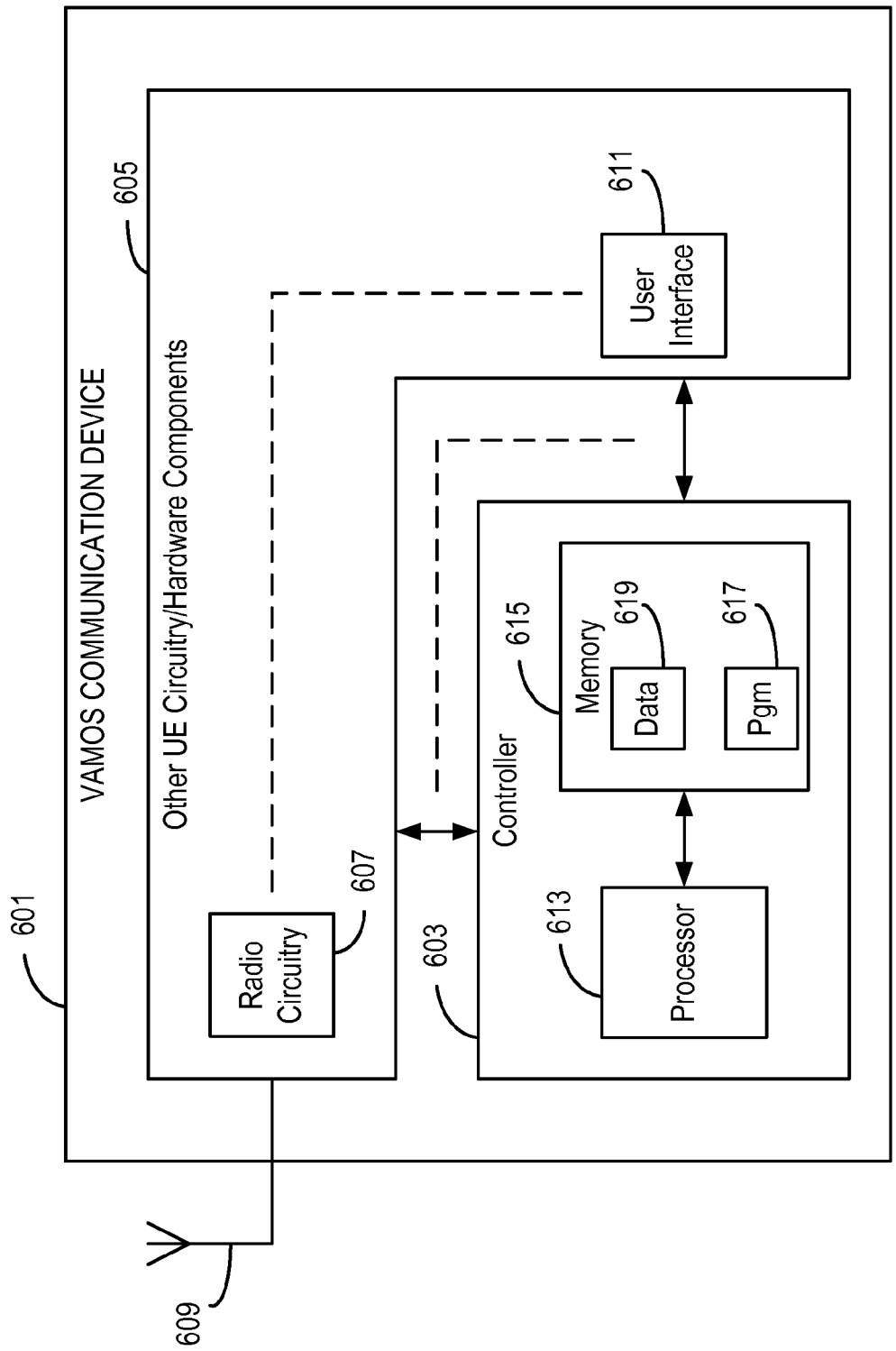
FIG. 6 is a block diagram of an exemplary VAMOS communication device that operates in accordance with various aspects described above.

FIG. 6 is a block diagram of an exemplary VAMOS communication device 601 that operates in accordance with various aspects described above, for example, with respect to FIGS. 3, 4, and 5. The communication device 601 includes a controller 603 coupled to other User Equipment (UE) circuitry/hardware components 605 that enable the communication device 601 to operate as a communication device. The other UE circuitry/hardware components 605 are generally known in the art, and may include such elements as, for example and without limitation, radio circuitry 607 coupled to one or more antennas 609. The other UE circuitry/hardware may also include some sort of user interface (e.g., display, keyboard, switch(es)) 611, although applications that call for use of a low cost/low power communication device may have very simplistic needs for a user interface 611 (e.g., a reset switch) or none at all.

The controller 603 includes circuitry configured to carry out any one or any combination of the random access aspects described above with respect to device actions. Such circuitry could, for example, be entirely hard-wired circuitry (e.g., one or more ASICs). Depicted in the exemplary embodiment of FIG. 6, however, is programmable circuitry, comprising a processor 613 coupled to one or more memory devices 615 (e.g., Random Access Memory, Magnetic Disc Drives, Optical Disc Drives, Read Only Memory, etc.). The memory device(s) store program means 617 (e.g., a set of processor instructions) configured to cause the processor 613 to control the other UE circuitry/hardware components 605 so as to carry out any of the device-related aspects described above. The memory 615 may also store data 619 representing various constant and variable parameters as may be needed by the processor 613 when carrying out its functions such as those specified by the program means 617.

Figure 7:
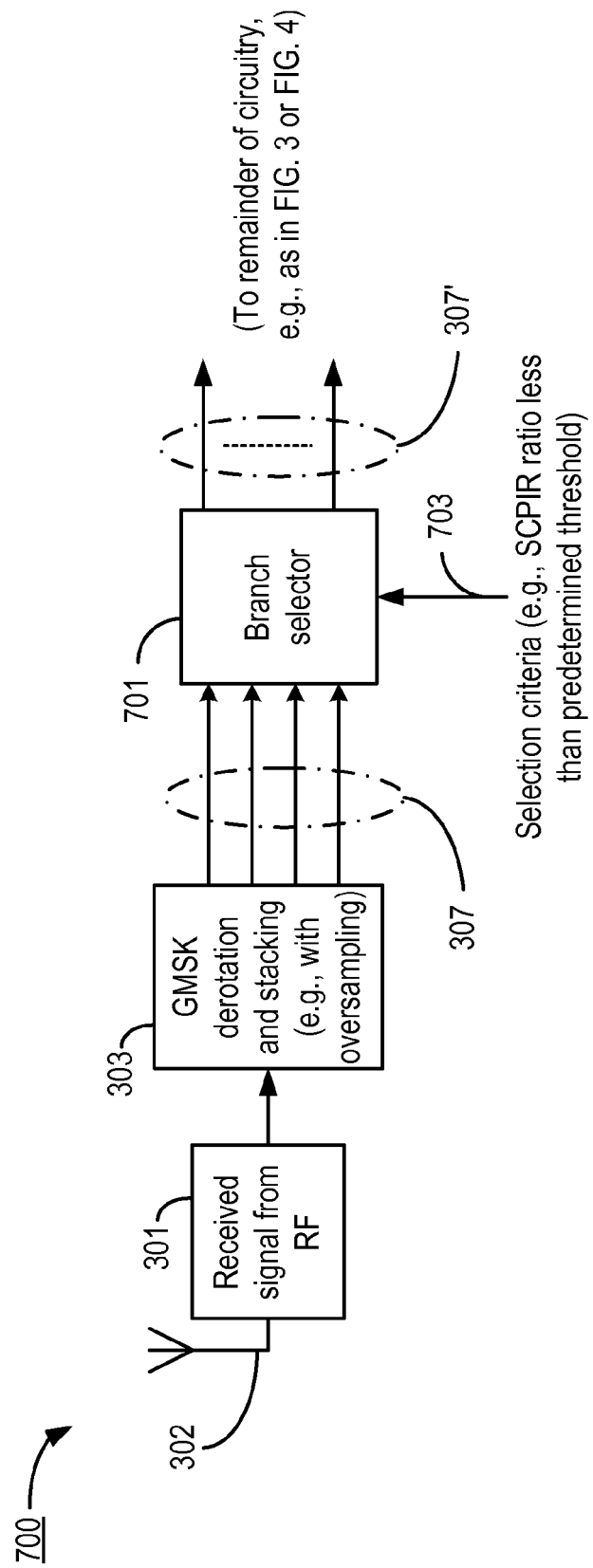
FIG. 7 is a block diagram of relevant parts of an exemplary receiver that, in some aspects of the invention, selectively uses only a subset of the generated signal branches.

In some but not necessarily all embodiments, after generating a given number of signal branches, only a (smaller) subset of these are actually processed (i.e., with successive interference cancellation and later demodulation). Selection of the subset can be made by, for example, using SCPIR estimate as the selection metric. For example, it can be decided that successive interference cancellation will be performed on only those signal branches that have a very low SCPIR ratio (e.g., less than −2 dB). FIG. 7 is a block diagram of relevant parts of an exemplary VAMOS receiver 700 that includes this feature. The exemplary VAMOS receiver 700 includes receiver circuitry 301, an antenna 302, and a GMSK derotation and stacking circuitry 303. These components were described earlier, making it unnecessary to describe them further here. As before, the output of the GMSK derotation and stacking circuitry 303 is a plurality of signal branches 307. In this class of embodiments, these signal branches 307 constitute a full set of branches that are supplied to branch selection circuitry 701. The branch selection circuitry 701 also receives one or more selection criteria 703 that will serve as the basis for selecting branches from among the full set of branches 307. Signal branches whose signals satisfy the selection criteria are supplied as a subset of signal branches 307', the number of which may vary dynamically as signal conditions change. The selected subset of signal branches 307' are then supplied to the remainder of the receiver circuitry (not shown in FIG. 7) such as is shown in either of FIGS. 3 and 4.

Figure 8:
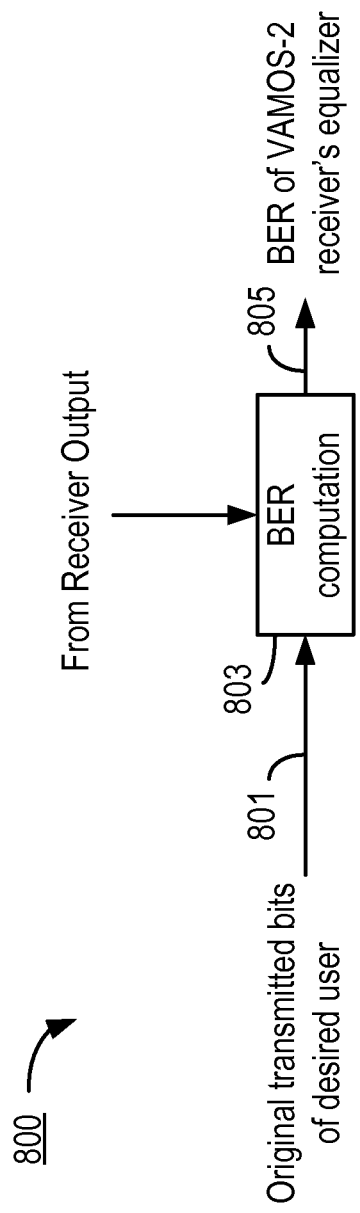
FIG. 8 is a block diagram of an arrangement for testing receiver performance.

A receiver consistent with embodiments of the invention was simulated, and its performance evaluated. This performance was found to be better than the performance of a conventional SIC receiver (e.g., as described earlier with reference to FIG. 1). The testing arrangement used for each receiver is depicted in FIG. 8. The original transmitted bits of the desired user 801 are known and are supplied to a Bit Error Rate (BER) computer 803 to serve as a basis of comparison against the output from the receiver to be tested, which is also supplied to the BER computer 803.

The output of the BER computer 803 is the BER 805, representing the BER of the VAMOS-2 receiver's equalizer.

Simulated test results will now be presented. A mobile station consistent with the invention and having 2 receive antennas with a 1× baseband signal stream (i.e., no oversampling) for each antenna is taken as the use case for performance evaluation. In these tests, the signal is stacked as four branches for performing successive interference cancellation as described earlier. The signal branches can be characterized as:

1. Branch 1: Real part of the set of (I, Q) samples of the received 1× signal stream corresponding to antenna 1.

2. Branch 2: Imaginary part of the set of (I, Q) samples of the received 1× signal stream corresponding to antenna 1.
3. Branch 3: Real part of the set of (I, Q) samples of the received 1× signal stream corresponding to antenna 2.
4. Branch 4: Imaginary part of the set of (I, Q) samples of the received 1× signal stream corresponding to antenna 2.

Figure 9A:
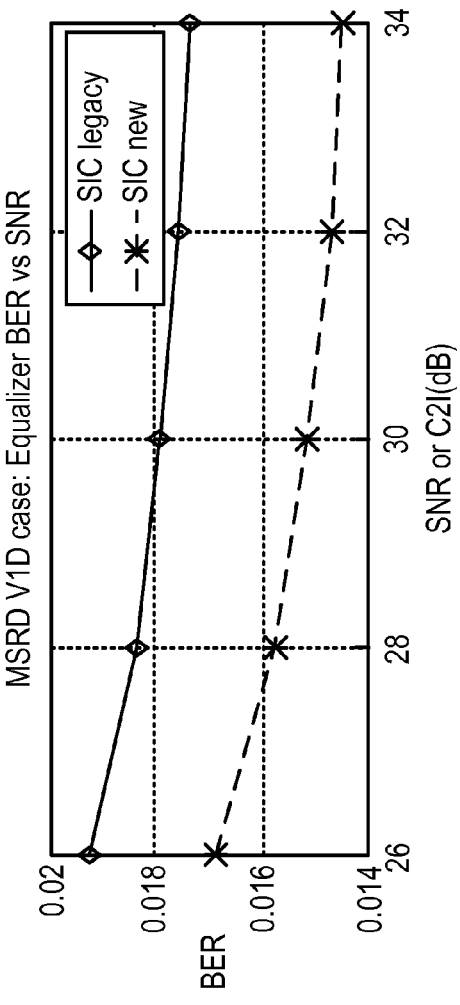
FIGS. 9a and 9b are graphs of test results showing VAMOS-2 performance for the Mobile Station Receive Diversity (MSRD) V-DTS1 case as specified by 3GPP TS45.005 (Single synchronous co-channel interferer).
Figure 9B:
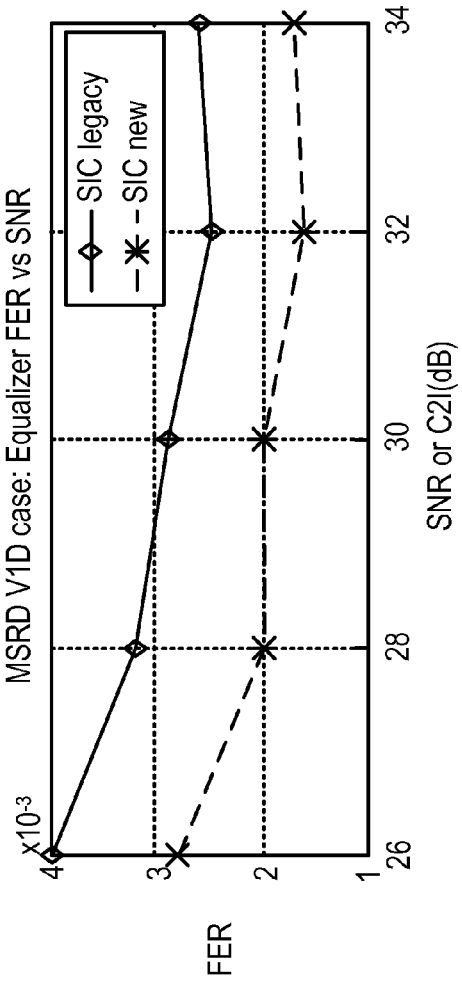

FIGS. 9a and 9b are graphs of test results showing VAMOS-2 performance for the Mobile Station Receive Diversity (MSRD) V-DTS1 case as specified by 3GPP TS45.005 (Single synchronous co-channel interferer). The logical channel used for the simulation results is TCH AHS 7.4 kbps for the case in which the SCPIR is −10 dB. FIG. 9a shows plots of BER vs. Signal to Noise Ratio (SNR) for the new type of receiver as disclosed herein ("SIC new") as well as for a conventional type of SIC receiver ("SIC legacy"). FIG. 9b shows plots of Frame Error Rate (FER) vs. SNR for an SIC new receiver as well as for an SIC legacy receiver. In each case, a comparison of the two graphs shows that substantially fewer errors are made by the SIC new receiver compared to the SIC legacy receiver, and this is true for all tested values of SNR.

Figure 10A:
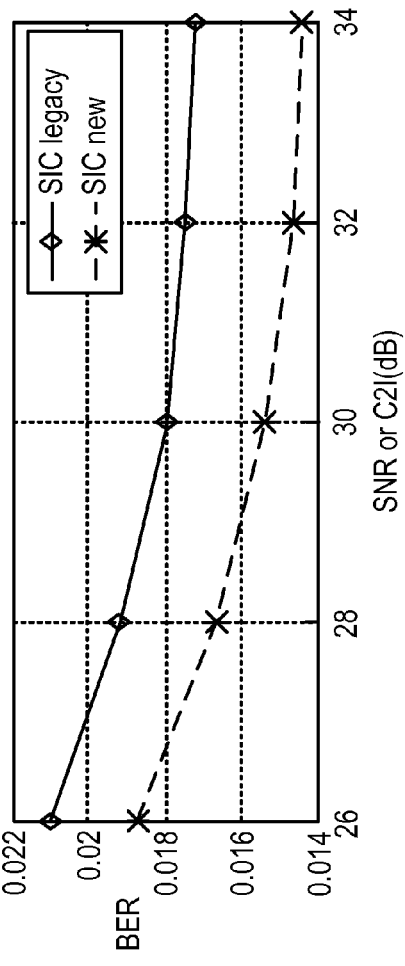
FIGS. 10a and 10b are graphs of test results showing VAMOS-2 performance for the MSRD V-DTS2 case as specified by 3GPP TS45.005 (synchronous multiple co-channel interferers).
Figure 10B:
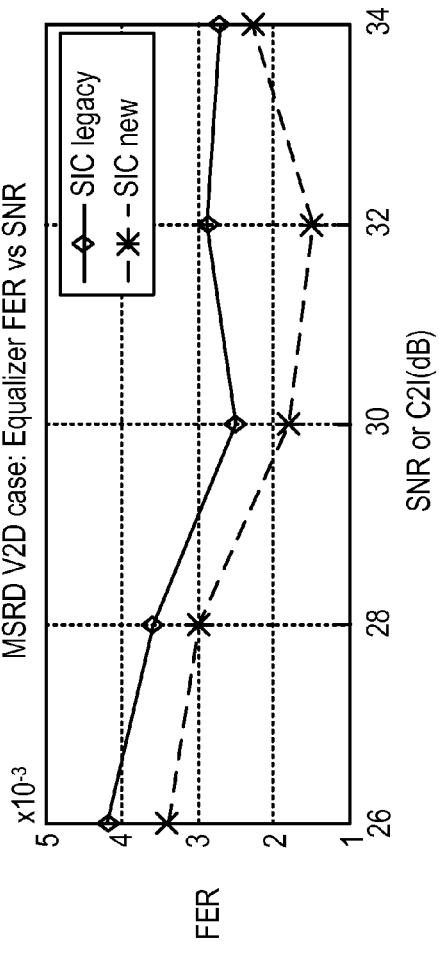

FIGS. 10a and 10b are graphs of test results showing VAMOS-2 performance for the MSRD V-DTS2 case as specified by 3GPP TS45.005 (synchronous multiple co-channel interferers). The logical channel used for the simulation results is TCH AHS 7.4 kbps for the case in which the SCPIR is −10 dB. FIG. 10a shows plots of BER vs. SNR for the SIC new receiver as well as for an SIC legacy receiver. FIG. 10b shows plots of FER vs. SNR for an SIC new receiver as well as for an SIC legacy receiver. In each case, a comparison of the two graphs shows that substantially fewer errors are made by the SIC new receiver compared to the SIC legacy receiver, and this is true for all tested values of SNR.

Figure 11A:
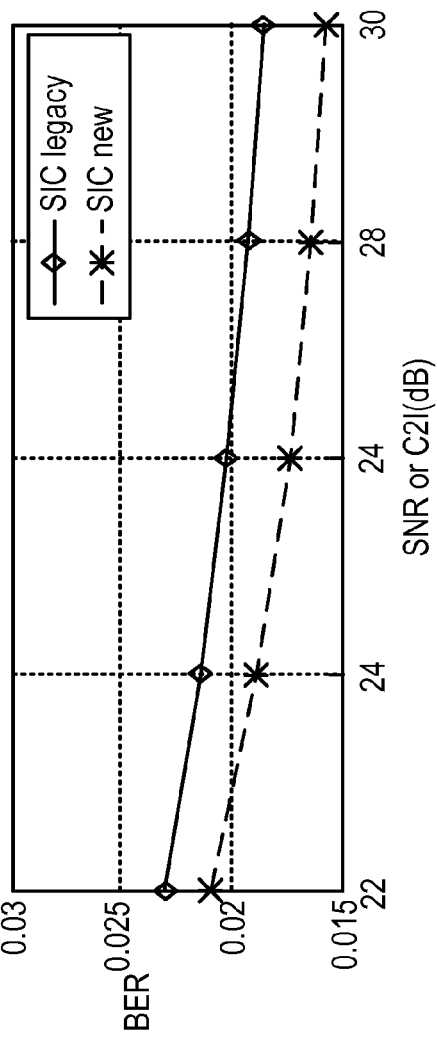
FIGS. 11a and 11b are graphs of test results showing VAMOS-2 performance for the MSRD V-DTS3 case as specified by 3GPP TS45.005 (single asynchronous co-channel interferer).
Figure 11B:
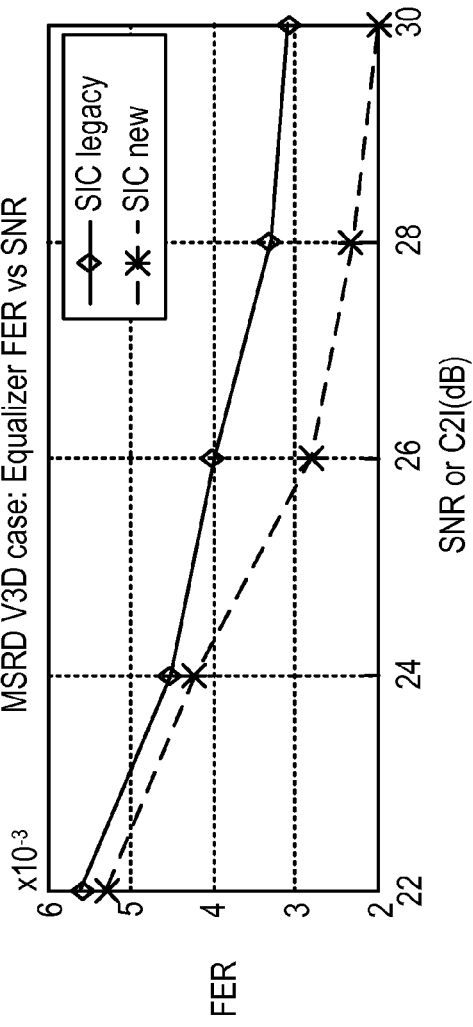

FIGS. 11a and 11b are graphs of test results showing VAMOS-2 performance for the MSRD V-DTS3 case as specified by 3GPP TS45.005 (single asynchronous co-channel interferer). The logical channel used for the simulation results is TCH AHS 7.4 kbps for the case in which the SCPIR is −10 dB. FIG. 11a shows plots of BER vs. SNR for the SIC new receiver as well as for an SIC legacy receiver. FIG. 11b shows plots of FER vs. SNR for an SIC new receiver as well as for an SIC legacy receiver. In each case, a comparison of the two graphs shows that substantially fewer errors are made by the SIC new receiver compared to the SIC legacy receiver, and this is true for all tested values of SNR.

Figure 12A:
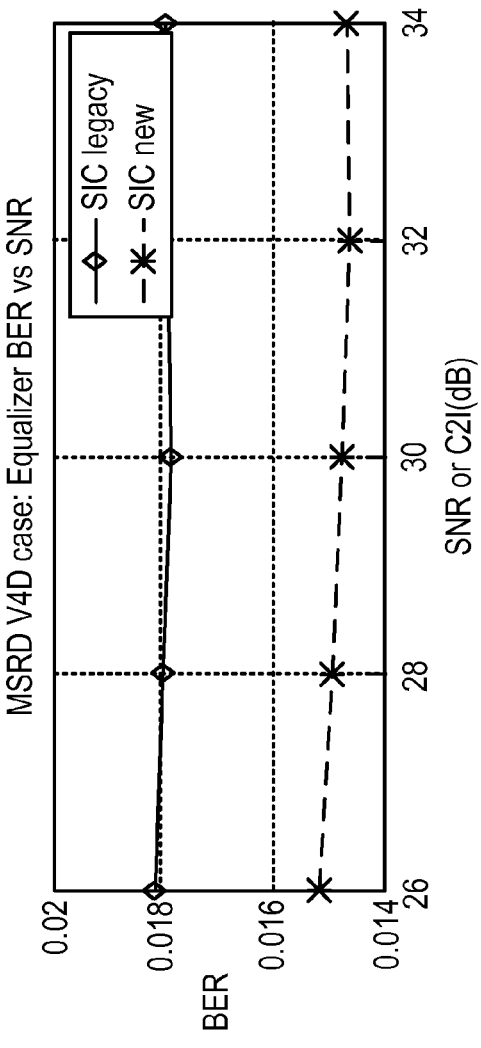
FIGS. 12a and 12b are graphs of test results showing VAMOS-2 performance for the MSRD V-DTS4 case as specified by 3GPP TS45.005 (single synchronous adjacent interferer).
Figure 12B:
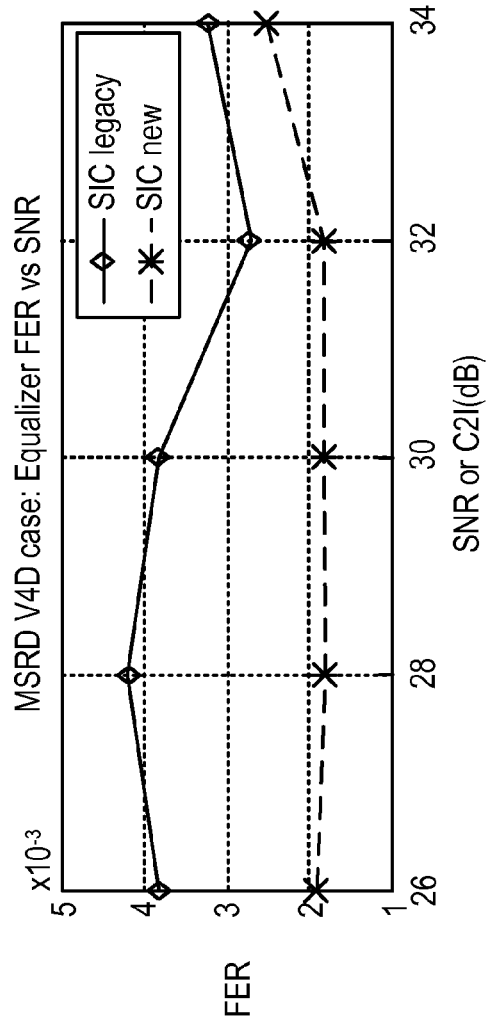

FIGS. 12a and 12b are graphs of test results showing VAMOS-2 performance for the MSRD V-DTS4 case as specified by 3GPP TS45.005 (single synchronous adjacent interferer). The logical channel used for the simulation results is TCH AHS 7.4 kbps for the case in which the SCPIR is −10 dB. FIG. 12a shows plots of BER vs. SNR for the SIC new receiver as well as for an SIC legacy receiver. FIG. 12b shows plots of FER vs. SNR for an SIC new receiver as well as for an SIC legacy receiver. In each case, a comparison of the two graphs shows that substantially fewer errors are made by the SIC new receiver compared to the SIC legacy receiver, and this is true for all tested values of SNR.

Figure 13A:
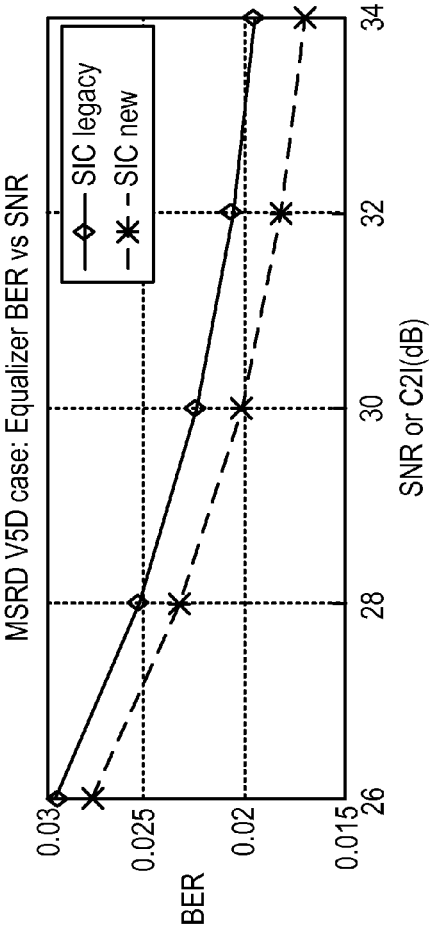
FIGS. 13a and 13b are graphs of test results showing VAMOS-2 performance for the MSRD V-DTS5 case as specified by 3GPP TS45.005 (sensitivity test configuration).
Figure 13B:
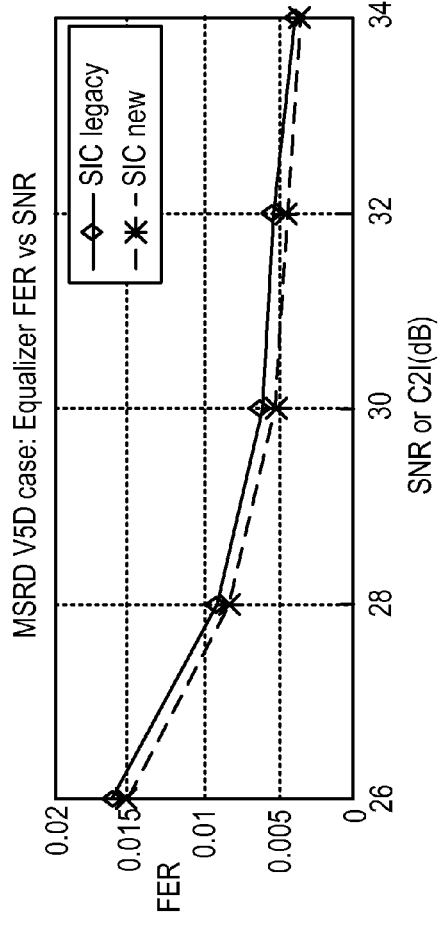

FIGS. 13a and 13b are graphs of test results showing VAMOS-2 performance for the MSRD V-DTS5 case as specified by 3GPP TS45.005 (sensitivity test configuration). The logical channel used for the simulation results is TCH AHS 7.4 kbps for the case in which the SCPIR is −10 dB. FIG. 13a shows plots of BER vs. SNR for the SIC new receiver as well as for an SIC legacy receiver. FIG. 13b shows plots of FER vs. SNR for an SIC new receiver as well as for an SIC legacy receiver. In each case, a comparison of the two graphs shows that substantially fewer errors are made by the SIC new receiver compared to the SIC legacy receiver, and this is true for all tested values of SNR.

Embodiments consistent with the invention exhibit performance levels that are in-between those of a conventional SIC receiver and a conventional joint demodulation receiver (joint MLSE receiver). As mentioned earlier, the complexity of joint demodulation receivers often render them unsuitable for mobile applications. Therefore, embodiments consistent with the invention are an attractive choice of implementation for mobile receivers where the complexity of joint demodulation receiver is out of scope.

In particular, embodiments consistent with the invention an improved successive interference cancellation when applied to VAMOS2 receivers improving the receiver performance in following ways:

1. Such embodiments improve the interference cancellation performance for a SIC architecture based VAMOS2 receiver compared to a legacy SIC receiver.
2. Such embodiments make it possible to have performance levels near to that of joint-detection receivers, with less complexity compared to a joint-detection receiver.
3. Mobile station receive diversity can be exploited by embodiments consistent with the invention.
4. For a receiver with multiple antennas or multiple receive paths, it is possible to select a subset of the original set (as described earlier), with this superior set selected for the receiver on the basis of the estimated interference ratio.
5. For a receiver with multiple antennas or multiple receive paths, it is possible to selectively run SIC on the branches of the subset (see #4 above) which are more affected by interference. This is done on the basis of the estimated interference ratio.
6. Such embodiments are characterized by low computational complexity compared with the joint detection receiver.
7. Such embodiments can be adapted for use in other wireless systems such as, but not limited to, Wideband Code Division Multiple Access (WCDMA), Long Term Evolution (LTE), or any other multiuser wireless systems to estimate the interference and suppress the same (upon knowing the other user's training sequence information). More particularly, aspects of embodiments consistent with the invention are most relevant when the desired and unwanted (interfering) users' signals are time aligned (e.g., by emanating from the same transmitter) so that the pilot bits of both users are known at each time instant, thereby facilitating performance of a joint channel estimation. In general, the unwanted (interfering) user's signal comes from another base station, and hence time alignment is not present. However in the case of VAMOS methodology, both the desired and unwanted users' signals are sent together by the same base transceiver station (BTS), so time alignment is guaranteed at the receiver.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of receiving a desired radio sub-channel transmitted by a transmitter during a time slot, wherein an unwanted radio sub-channel is also transmitted by the transmitter during the time slot and wherein the desired radio sub-channel and unwanted radio sub-channel are orthogonal to one another at a time of transmission, the method comprising:
   receiving a radio signal during the time slot, wherein the radio signal comprises the desired radio sub-channel and unwanted radio sub-channel;
   producing a plurality of signal branches from the received radio signal by treating orthogonal components of the received radio signal as separate branches and also by generating separate signal branches by one or both of oversampling and using multiple receive antennas;
   using joint channel estimation to independently process more than one of the plurality of signal branches and to produce therefrom for each of the more than one of the plurality of signal branches a channel estimate for the desired radio sub-channel and a channel estimate for the unwanted radio sub-channel;
   producing an estimate of unwanted radio sub-channel bits from a non-stacked form of the received radio signal;
   using the channel estimates and the estimate of the unwanted radio sub-channel bits to reconstruct unwanted radio sub-channel components for each of the more than one of the plurality of signal branches;
   producing desired radio sub-channel signal branches by subtracting a corresponding one of the reconstructed unwanted radio sub-channel components from each of the more than one of the plurality of signal branches;
   producing a non-stacked desired signal by combining the desired radio sub-channel signal branches; and
   processing the non-stacked desired signal to receive the desired radio sub-channel.

2. The method of claim 1, wherein said more than one of the plurality of signal branches are the plurality of signal branches.

3. The method of claim 1, comprising: selecting the more than one of the signal branches from the plurality of signal branches based on one or more selection criteria.

4. The method of claim 3, wherein the one or more selection criteria comprise comparing a sub-channel power imbalance ratio with a predetermined threshold.

5. The method of claim 1, wherein the orthogonality between the desired radio sub-channel and unwanted radio sub-channel is achieved by one of the desired radio sub-channel and unwanted radio sub-channel being transmitted as an in-phase component of the radio signal and a different one of the desired radio sub-channel and unwanted radio sub-channel being transmitted as a quadrature component of the radio signal.

6. The method of claim 1, wherein using joint channel estimation to independently process the more than one of the signal branches and to produce therefrom for each of the more than one of the signal branches the channel estimate for the desired radio sub-channel and the channel estimate for the unwanted radio sub-channel comprises:
   for each of the more than one of the signal branches, recursively refining a branch channel estimate to derive the branch channel estimate for the desired radio sub-channel and the branch channel estimate for the unwanted radio sub-channel.

7. The method of claim 1, wherein using joint channel estimation to independently process the more than one of the signal branches and to produce therefrom for each of the more than one of the signal branches the channel estimate for the desired radio sub-channel and the channel estimate for the unwanted radio sub-channel comprises:
   estimating a value of a sub-channel power imbalance ratio that was used by the transmitter when forming the radio signal from the desired radio sub-channel and the unwanted radio sub-channel; and
   for each of the signal branches, scaling a channel estimate of one of a desired user's channel estimate and an unwanted user's channel estimate by a scaling factor that is related to the estimated value of the sub-channel power imbalance ratio.

8. The method of claim 7, wherein estimating the value of the sub-channel power imbalance ratio that was used by the transmitter when forming the radio signal from the desired radio sub-channel and the unwanted radio sub-channel comprises:
   choosing an initial sub-channel power imbalance ratio value as a ratio of power of independent least-squares channel estimates; and
   using an iterative process that begins with the initial sub-channel power imbalance ratio value and produces refined interim sub-channel power imbalance ratio values until a convergence criterion is satisfied.

9. The method of claim 1, wherein using the channel estimates and the estimate of the unwanted radio sub-channel bits to reconstruct the unwanted radio sub-channel components for each of more than one of the signal branches comprises:
   for each of the signal branches, convolving the channel estimate for the unwanted radio sub-channel with the estimate of the unwanted radio sub-channel bits.

10. An apparatus for receiving a desired radio sub-channel transmitted by a transmitter during a time slot, wherein an unwanted radio sub-channel is also transmitted by the transmitter during the time slot and wherein the desired radio sub-channel and unwanted radio sub-channel are orthogonal to one another at a time of transmission, the apparatus comprising:
   radio circuitry configured to receive a radio signal during the time slot, wherein the radio signal comprises the desired radio sub-channel and unwanted radio sub-channel;
   circuitry configured to produce a plurality of signal branches from the received radio signal by treating orthogonal components of the received radio signal as separate branches and also by generating separate signal branches by one or both of oversampling and using multiple receive antennas;
   circuitry configured to use joint channel estimation to independently process more than one of the plurality of signal branches and to produce therefrom for each of the more than one of the plurality of signal branches a channel estimate for the desired radio sub-channel and a channel estimate for the unwanted radio sub-channel;
   circuitry configured to produce an estimate of the unwanted radio sub-channel bits from a non-stacked form of the received radio signal;
   circuitry configured to use the channel estimates and the estimate of the unwanted radio sub-channel bits to reconstruct unwanted radio sub-channel components for each of the more than one of the plurality of signal branches;
   circuitry configured to produce desired radio sub-channel signal branches by subtracting a corresponding one of the reconstructed unwanted radio sub-channel components from each of the more than one of the plurality of signal branches;

circuitry configured to produce a non-stacked desired signal by combining the desired radio sub-channel signal branches; and circuitry configured to process the non-stacked desired signal to receive the desired radio sub-channel.

11. The apparatus of claim 10, wherein said more than one of the plurality of signal branches are the plurality of signal branches.

12. The apparatus of claim 10, comprising:

circuitry configured to select the more than one of the signal branches from the plurality of signal branches based on one or more selection criteria.

13. The apparatus of claim 12, wherein the one or more selection criteria comprise comparing a sub-channel power imbalance ratio with a predetermined threshold.

14. The apparatus of claim 10, wherein the orthogonality between the desired radio sub-channel and unwanted radio sub-channel is achieved by one of the desired radio sub-channel and unwanted radio sub-channel being transmitted as an in-phase component of the radio signal and a different one of the desired radio sub-channel and unwanted radio sub-channel being transmitted as a quadrature component of the radio signal.

15. The apparatus of claim 10, wherein the circuitry configured to use joint channel estimation to independently process the more than one of the signal branches and to produce therefrom for each of the more than one of the signal branches the channel estimate for the desired radio sub-channel and the channel estimate for the unwanted radio sub-channel comprises:

circuitry configured to recursively refine, for each of the more than one of the signal branches, a branch channel estimate to derive the branch channel estimate for the desired radio sub-channel and the branch channel estimate for the unwanted radio sub-channel.

16. The apparatus of claim 10, wherein the circuitry configured to use joint channel estimation to independently process the more than one of the signal branches and to produce therefrom for each of the more than one of the signal branches the channel estimate for the desired radio sub-channel and the channel estimate for the unwanted radio sub-channel comprises:

circuitry configured to estimate a value of a sub-channel power imbalance ratio that was used by the transmitter when forming the radio signal from the desired radio sub-channel and the unwanted radio sub-channel; and circuitry configured to, for each of the signal branches, scale a channel estimate of one of a desired user's channel estimate and an unwanted user's channel estimate by a scaling factor that is related to the estimated value of the sub-channel power imbalance ratio.

17. The apparatus of claim 16, wherein the circuitry configured to estimate the value of the sub-channel power imbalance ratio that was used by the transmitter when forming the radio signal from the desired radio sub-channel and the unwanted radio sub-channel comprises:

circuitry configured to choose an initial sub-channel power imbalance ratio value as a ratio of power of independent least-squares channel estimates; and circuitry configured to use an iterative process that begins with the initial sub-channel power imbalance ratio value and produces refined interim sub-channel power imbalance ratio values until a convergence criterion is satisfied.

18. The apparatus of claim 10, wherein the circuitry configured to use the channel estimates and the estimate of the unwanted radio sub-channel bits to reconstruct the unwanted radio sub-channel components for each of more than one of the signal branches comprises: circuitry configured to, for each of the signal branches, convolve the channel estimate for the unwanted radio sub-channel with the estimate of the unwanted radio sub-channel bits.

\* \* \* \* \*